United States Patent [19]

Auracher et al.

[11] 4,087,315

[45] May 2, 1978

[54] METHOD FOR PRODUCING LIGHT CONDUCTOR STRUCTURES WITH INTERLYING ELECTRODES

[75] Inventors: Franz Auracher, Munich; Guido Bell, Gilching, both of Germany

[73] Assignee: Siemens Aktiengesellschaft, Berlin & Munich, Germany

[21] Appl. No.: 804,570

[22] Filed: Jun. 8, 1977

[30] Foreign Application Priority Data

Jun. 14, 1976    Germany ............................. 2626563

[51] Int. Cl.$^2$ ................................................. G02B 5/23
[52] U.S. Cl. ...................................... 156/656; 29/578; 29/599; 96/36; 96/38.4; 148/187; 148/188; 156/657; 156/659; 350/96.10; 427/88; 427/93
[58] Field of Search ............... 156/656, 657, 667, 659; 96/36, 38.4; 427/57, 74, 88, 93; 148/187, 188, 183; 350/160 R, 96 WG; 29/578, 579, 584

[56] References Cited

U.S. PATENT DOCUMENTS

| 3,877,782 | 4/1975 | Kaminow | 350/160 R |
| 3,923,374 | 12/1975 | Martin | 350/160 R |
| 4,005,927 | 2/1977 | Caton | 350/160 R |
| 4,048,591 | 9/1977 | Auracher | 350/160 R |

Primary Examiner—William A. Powell
Assistant Examiner—Jerome W. Massie
Attorney, Agent, or Firm—Hill, Gross, Simpson, Van Santen, Steadman, Chiara & Simpson

[57] ABSTRACT

A method for producing a light conductor structure having a pair of light conductors embedded in a substrate and electrodes arranged between and along the light conductors, which structure is particularly adapted for use as an electrically controllable coupler, characterized by providing a substrate of an electro-optical material having a c-axis parallel to one surface of the substrate and extending at right angles to the longitudinal axes of the later formed light electrodes, forming a layer of polycrystalline silicon in zones of the substrate, which lie adjacent to second zones of said one surface in which second zones the light conductors will be formed; applying a layer of diffusion material to the silicon layer and the second zones which are free of silicon; diffusing the diffusion material into the substrate by heating to an elevated temperature to form light conductors by increasing the index of refraction of the light conductor above the index of refraction of the remaining portions of the substrate; applying a layer of chrome to the light conductors and the diffusion material disposed on the layer of silicon; removing the silicon layer and the layers of diffusion material and chrome carried thereon; applying a positive-acting layer of photo-lacquer; exposing the photo-lacquer through the substrate with the chrome covering the light conductors acting as a mask; developing the photo-lacquer layer to remove the exposed portions and retaining the unexposed portions overlying the light conductors; applying a metal layer to form electrodes adjacent to the light conductors; removing the remaining portion of the photo-lacquer layer; and then etching away the chrome layer lying on the light conductors.

9 Claims, 12 Drawing Figures

METHOD FOR PRODUCING LIGHT CONDUCTOR STRUCTURES WITH INTERLYING ELECTRODES

BACKGROUND OF THE INVENTION

1. Field of the Invention

The present invention is directed to a method for the production of light conductor structures which have electrodes arranged between the light conductors.

2. Prior Art

Light conducting structures, which have a pair of light conductors on a substrate with an electrode disposed therebetween are known. Such structures are used as electrically controllable directional couplers in optical communication technology and act as on/off switches or cross-over switches. In addition, such structures are used as electro-optical modulators.

A common feature of these structures is that the two light conductors possess a zone in which they are very closely adjacent to one another. Electrodes are arranged between the light conductors and beside each of the light conductors. In this zone, a typical value for the spacing between a pair of light conductors is 3 $\mu$m. This means that the electrodes must be precisely aligned in their position and that permissible tolerances in the location of the electrodes are less than 1 $\mu$m.

German Offenlegungsschrift No. 2,526,117 describes a method for producing this type of light conductor structure. As disclosed in this reference, a metal layer is applied to a substrate consisting of a ferroelectric material. This metal layer is removed in the regions of where the light conductors are to be formed so that the surface of the substrate is exposed at these regions or areas. Thereafter, a diffusion material is applied to the metal layer and to the exposed zones or areas of the surface of the substrate. During a high temperature diffusion process, this diffusion material diffuses into the exposed zones of the substrate to increase the index of refraction of the substrate in the zones so that these zones having the increased index of refraction act as light conductors or optical waveguides. In the region of the two waveguides, opposing, remanent electric polarizations are now produced in the substrate and the metal located between the light conductors is then removed from the substrate. The remaining metallizations which are present on the surface of the substrate serve as the electrodes.

Fundamentally, this production or method could also be used for the production of electrodes located between two light conductors. As a variation of the process described in the above-mentioned German reference, the metallization located between the light conductors would then have to remain on the substrate. This metallization would then serve as an electrode and as a result of the production process this electrode would be automatically positioned between the light conductors with a high or extreme accuracy.

Since, however, the metallizations are exposed to high temperatures during the diffusion process for the production of the light conductors, it is unavoidable that a portion of the metallizations will also diffuse into the substrate. However, this condition is extremely undesirable and would thereby reduce the quality of the light conductors. In particular, a danger exists that a light conducting layer will form beneath the metallizations.

In addition, the danger exists that the metallizations will become oxidized and thus might become electrically non-conductive. It is also possible that without special adhesives, the metallizations will not adhere firmly on the substrate so that at the high temperatures prevailing during the diffusion process, the metallizations can contract to form small islands which are insulated from one another.

SUMMARY OF THE INVENTION

The present invention is directed to a method for forming a light conducting structure having interlying electrodes which are extremely accurately dimensioned within narrow tolerances and which process avoids the difficulties which occurred with prior art processes.

To accomplish these aims, the present invention is directed to a method for forming a light conductor structure having a pair of light conductors or waveguides embedded in one surface of a substrate of an electro-optical material having its c-axis extending parallel to the surface at a right angle to the light conductors and having electrodes extending between the light conductors, said structure being particularly adapted for use as an electrically controllable coupler. The method comprises the steps of providing a substrate of electro-optical material having said one surface; covering zones of said surface of the substrate, which zones lie adjacent second zones of the surface in which the light conductors are to be formed with a layer of polycrystalline silicon so the second zones are free of the silicon layer; applying a layer of diffusion material on the silicon layer and the second zones of said one surface of the substrate; diffusing the diffusion material into the surfaces of the substrate at said silicon-free second zones to form light conductors having an index of refraction greater than the index of refraction of the substrate by heating the structure to an elevated temperature; cooling the substrate; applying a layer of chromium to cover the light conductors and the undiffused layer of diffusion material; removing the layer of polycrystalline silicon together with those portions of the diffusion material and chromium layer arranged thereon to expose said one surface of the substrate adjacent to the light conductors; applying a layer of positive-acting photo-lacquer on said one surface and the remaining portion of the layer of chromium; exposing the layer of photo-lacquer through the substrate with the remaining chromium layer disposed on the light conductors acting as a mask; developing the layer of photo-lacquer so that the unexposed portions remain on the chromium layers covering the light conductors and the exposed portions are removed from said one surface of the substrate; applying a metal layer to the exposed portions of said one surface of the substrate with the remaining photo-lacquer acting as a mask; removing the remaining photo-lacquer along with the metal layer deposited thereon and then etching the chromium layers from the light conductors.

A preferred embodiment of the method includes prior to applying the metal layers to form the electrodes, applying a thin dielectric layer whose index of refraction is lower than that of the substrate and then applying the metal layer forming the electrodes. In both embodiments of the method after developing the photo-lacquer layer and prior to depositing a subsequent layer, it is desirable to laterally etch the chromium layer, which is disposed on each of the light conductors and is covered by the photo-lacquer, to form undercuts therein.

DESCRIPTION OF THE PREFERRED EMBODIMENT

Figure 12:
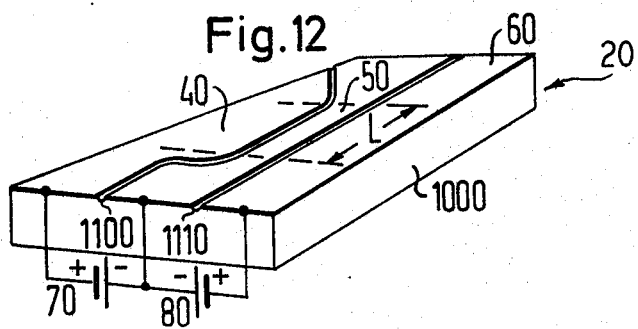
FIG. 12 is a perspective view of the light conductor structure produced in accordance with the method of the present invention.

The principles of the present invention are particularly useful for producing a light conductor structure generally indicated at 20 in FIG. 12.

To produce this structure 20, a substrate 1, which consists of an electro-optical crystal, for example lithium niobate (LiNbO$_3$) or lithium tantalate (LiTaO$_3$), is provided. The substrate 1 has a substrate surface 7 and the c-axis of the substrate extends parallel to the surface 7 and at right angles to the direction of the longitudinal axes of the later formed light conductors. A polycrystalline silicon layer 2, which has a thickness of approximately 400 nm, is applied to the substrate surface 7.

After applying the silicon layer 2, a photo-lacquer layer is applied on the layer 2. The layer is exposed using a desired mask and developed to provide an etching mask 3, which exposes portions or zones 8 of the silicon layer 2. Thus, after forming the mask 3, the zones 8 of the layer 2, which zones have the configuration or shape of the latter formed light conductors or light waveguides, will not be covered by the mask 3 while those zones which are not to be formed into the light conductors will be covered.

Figure 3:
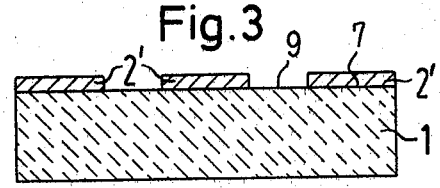

Subsequent to forming the mask 3, which is defined by the developed photo-lacquer layer, the layer 2 of polycrystalline silicon is etched until zones or portions 9 of the surface 7 of the substrate 1 are exposed. Thus, the surface 7 has portions 9, which are silicon-free portions, and portions covered by the remaining portion 2' of the layer of polycrystalline silicon. After etching, the photo-lacquer layer is removed. As illustrated in FIG. 3, the state of the substrate 1 is now that it has exposed portions 9, which will be subsequently provided for the later formed light conductors and the surface 7 is covered by a diffusion mask comprising the remaining portions 2' of the polycrystalline silicon layer between and beside these zones 9.

Figure 4:
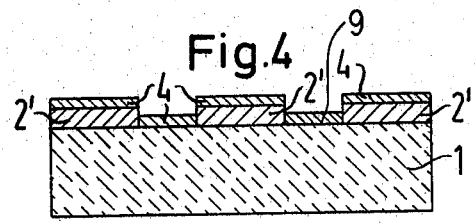

Light conductors are now produced by means of a diffusion or doping process. For this purpose, as illustrated in FIG. 4, a layer of diffusion material 4 is applied to the structure which has been formed so far. This can be effected, for example, by vapor depositing or sputtering. Suitable diffusion materials are titanium or niobium. The diffusion material of the layer 4 will have a thickness of between approximately 30 to 50 nm.

To diffuse the material of the layer 4 into the substrate 1, the substrate is heated to approximately 950° C. to 980° C. for approximately 3 to 5 hours. During this high temperature process, the diffusion material in the layer 4 will diffuse into the substrate at the surface areas 9 which are not covered by the polycrystalline silicon mask 2'. As a result of the penetration of the diffusion material into the substrate, zones 100 and 110 (FIG. 5) are formed which zones have an index of refraction, which is higher than the index of refraction of the substrate, and these zones will act as light conductors or waveguides. After heating the structure to accomplish the diffusion to form the light conductors 100 and 110, the substrate is cooled in an oxygen atmosphere for the following reasons. During the preceding diffusion process, not only does diffusion material diffuse into the substrate 1 but the substrate also will lose oxygen as a result of diffusion. As a result of this diffusion loss of oxygen, the substrate 1 will become colored and develop absorption properties. By cooling the substrate from the elevated diffusion temperature range in an oxygen atmosphere, the oxygen supplied to the substrate during the cooling will render the substrate clear again and restore its original, high, optical transparency.

The Curie temperature of lithium tantalate is below the temperature range of the diffusion process. In order to insure that the c-axes are aligned and parallel to the substrate surface and at right angles to the longitudinal axis of the light conductors 100 and 110 after the diffusion step, the substrate consisting of lithium tantalate must be poled during the cooling from the elevated temperatures. To accomplish this, auxiliary electrodes, which are connected to a DC voltage source, are arranged beside the two substrate edges which lie parallel to the light conductors 100 and 110. The application of a DC voltage to the auxiliary electrodes produces an electric field in the substrate which is parallel to the substrate surface 7 and at right angles to the longitudinal axis of the waveguides 100 and 110. This inevitably will produce the corresponding orientation of the c-axes of the substrate 1 consisting of lithium tantalate.

When the substrate consists of lithium niobate, this additional poling or biasing is not necessary because the Curie temperature of lithium niobate is above the temperature range of the diffusion process.

Figure 5:
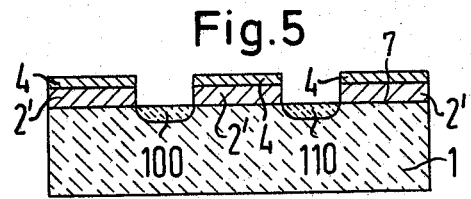

After producing the structure illustrated in FIG. 5, a layer 5 (FIG. 6) of chromium is vapor deposited on the remaining portions of the layer 4 and on the waveguides or light conductors 100 and 110. The layer 5 will have a thickness, which will amount to approximately 200 nm. Since the etching edges of the remaining portions 2' of the polycrystalline silicon layer are normally very steep, the chromium coating or layer 5 will break off at these edges so that the etching edges of the remaining portions 2' of the silicon layer as well as the remaining portion of the diffusion material 4, which is disposed on the portion 2', remain uncovered by the chromium layer 5.

Figure 6:
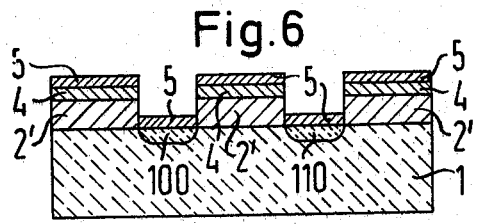

After applying the chromium layer 5, the next step of the method is to remove the remaining portions 2' of the silicon and the remaining portions of the diffusion material that is disposed thereon. To accomplish this, the remaining portions 2' of polycrystalline silicon is removed by etching, which is carried out in a plasma composed of methane tetrafluoride (CF$_4$). For this purpose, the structure of FIG. 6 is introduced into a vacuum chamber filled with methane tetrafluoride, wherein the pressure is normally between 0.5 to 1 torr. In this gas atmosphere, a gas discharge is now produced, for example by an electric high frequency field, which has a typical frequency value of 13.5 MHz. Since the layer of polycrystalline silicon is covered by the titanium or niobium layer 4 of diffusion material and the chromium layer 5, the etching attack takes place only at the exposed edges of the remaining portions 2' of the polycrystalline silicon. With an etching time of approximately 30 to 40 minutes, the silicon layer is laterally etched away to a width of approximately 10 μm.

Figure 1:
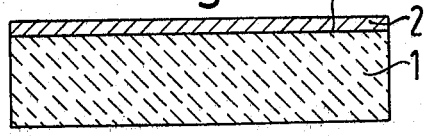
FIGS. 1–11 are cross-sectional views illustrating the steps of the method producing the light conductor structure in accordance with the present invention.
Figure 2:
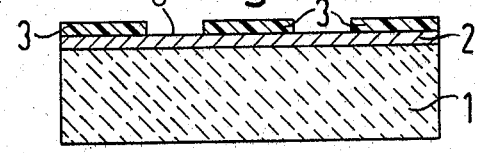

In order to avoid long etching times, it is advantageous to construct the etching mask 3 of the photo-lacquer layer (FIG. 2) in such a way that fundamentally only a 10 μm wide strip of photolacquer remains beside the zones 8 of the slicon layer 2, which zones 8 subsequently denote the zones in which the light conductors are formed. Thus, silicon layer 2 has surface zones 8, which remain free of photo-lacquer, and also has additional photo-lacquer-free zones, which are spaced at a distance of more than approximately 10 μm from the edges of zones 8. Later, after the diffusion process all the areas that are not covered by the photo-resist or photo-lacquer will have a high index layer under the surface. However, only the two coupled waveguides 100 and 110 are of interest. The additional waveguiding areas have practically no influence on the two coupled waveguides 100 and 110 due to their large separation ($\geq 10$ μm) from them. The area between the zones 8 and those additional zones, which are spaced therefrom, are covered with the photo-lacquer layer 3. During the following etching of the polycrystalline silicon, only those parts of the layer of polycrystalline silicon which lie beneath the strips 3 of photo-lacquer will be the remaining portions 2' of the silicon layer.

Figure 7:
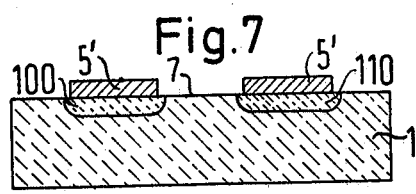

After etching with the methane tetrafluoride to remove the remaining portions 2' of the silicon layer from the surface 7 of the substrate 1, a structure such as illustrated in FIG. 7 is obtained. As illustrated, the light conductors 100 and 110 are still covered by the strips 5' of the chromium layer.

Figure 8:
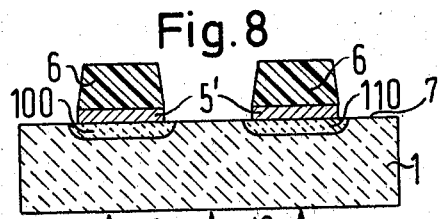

The next step of the process comprises applying a layer of positively-acting photo-lacquer to the surface 7 of the substrate 1 and the remaining strips 5' of chromium. This photo-lacquer layer is exposed to light, which is directed through the substrate 1 as illustrated by arrows 10 (FIG. 8) and the remaining portions or strips 5' of chromium acts as a light impermeable mask. After exposing the photo-lacquer layer, it is developed so that those parts of the photo-lacquer layer, which are outside of the strips 5' of chromium and were illuminated, are removed and the unexposed portions of the photo-lacquer layer are retained as strips 6 which remain on the strips 5' of the chromium (FIG. 8).

The photo-lacquer may consist, for example of Shipley AZ1350 lacquer. This lacquer is sensitive to ultraviolet light and accordingly, it is illuminated through the substrate with an ultraviolet light source, for example a mercury vapor lamp.

Figure 9:
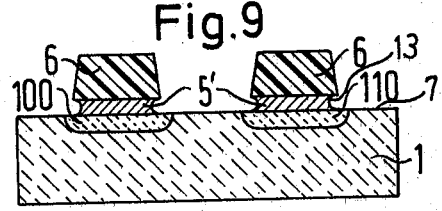
Figure 10:
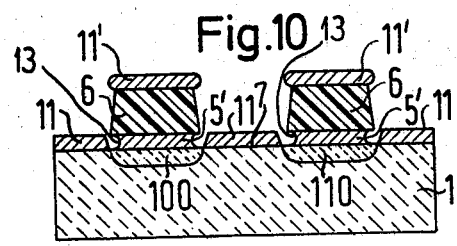

In accordance with the preferred embodiments of the method, the edges of the remaining chromium strips 5' are laterally etched to approximately 200 nm to form undercuts 13 (FIGS. 9 and 10). This etching can be effected with cerium salts and the undercuts 13 will facilitate and simplify the later removal of the strips 11' of the electrode material.

In accordance with the particularly advantageous embodiment of the method, a thin, dielectric layer, such as a glass layer having an approximate thickness of 100 nm, is vapor deposited or sputtered onto the surface 7 of the substrate 1. This dielectric layer 12 is to possess an index of refraction, which is lower than the index of refraction of the material of the substrate 1. The function of this dielectric layer 12 is to optically isolate the later produced metal electrodes from the light conductors 100 and 110 and thus at the boundary area between the light condutors 100 and 110 and the dielectric layer 12, a light beam is reflected back into the light conductors. This feature serves to avoid light lossess in the light conductors.

To provide electrodes for the structure, a layer 11 of electrode material, for example an aluminum layer, is vapor deposited onto the one surface 7 of the substrate 1 (FIG. 7) or onto the dielectric layer 12, if one was deposited prior to the depositing of the layer 11. This layer 11 can possess a thickness of between 200 and 400 nm. The vapor depositing is carried out satisfactorily at a substrate temperature below 300° C.

After applying the layer 11 of the electrode material, the strips 6 of photo-lacquer along with the electrode material 11' deposited thereon are removed. The photo-lacquer can be dissolved with the commercially available strippers or acetone. The photo-lacquer will first swell up and the layers located thereon are removed. At the same time, the photo-lacquer will become detached from the chromium strips 5' and, thus, are detached from the structure.

With the removal of the photo-lacquer strips 6, the strips 5' of chromium are still present on the waveguides or light conductors 100 and 110. To remove these strips 5' of chromium, they are etched by using plasma etching in an oxygen atmosphere or in a commercially available chlorine-helium-oxygen mixture. The procedure of the plasma etching is identical to the above described plasma etching with methane tetrafluoride for removal of the portions 2' of the silicon layer. During this process step, oxidation of the layer 11 of the electrode materials, for example aluminum, is no greater than the amount of oxidation which will occur during storage of the device in air.

Figure 11:
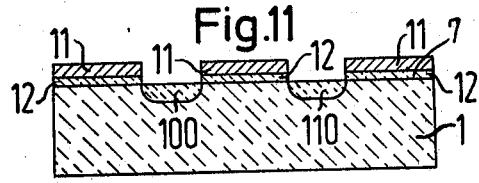

The desired structure is now complete and is illustrated in FIG. 11, the two light conductors 110 and 111 are embedded in the substrate 1, which consists of an electro-optical crystal whose c-axis is parallel to the substrate surface 7 and at right angles to the longitudinal axes of the light conductors 100 and 110. Beside these light conductors and between them are arranged electrodes, which are formed by the residue or remaining portions of the electrode layer 11. In accordance with the advantageous embodiment of the invention, these electrodes are optically isolated from the substrate by a layer 12 of the thin dielectric material.

As illustrated in FIG. 12, the finished structure 20 which serves as a modulator has the substrate 1000, which is provided with two embedded light conductors or waveguides 1100 and 11100 which are closely adjacent to one another along a coupling length L. Between and beside the light conductors 1100 and 1110, the substrate has electrodes 40, 50 and 60. By connecting a voltage from voltage sources 70 and 80 to these electrodes, it is possible to modify the optical properties of the light conductors 1100 and 1110.

Although various minor modifications may be suggested by those versed in the art, it should be understood that we wish to embody within the scope of the patent warranted hereon, all such modifications as reasonably and properly come within the scope of our contribution to the art.

We claim:

1. A method for the production of a light conducting structure having a pair of light conductors embedded in one surface of a substrate of an electro-optical material having a c-axis extending parallel to the surface and at right angles to the light conductors and having an electrode extending between the light conductors, said structure being particularly adapted for use as an electrically controllable coupler, said method comprising the steps of providing a substrate of the electro-optical material having said one surface; covering zones of said surface of the substrate, which zones lie adjacent to second zones of the surface in which the light conductors are to be formed, with a layer of polycrystalline silicon so the second zones are free of the silicon layer; applying a layer of diffusion material on the silicon layer and the second zones of the said one surface of the substrate; diffusing the diffusion material into the surface of the substrate at said silicon-free second zones to form light conductors having an index of refraction greater than the index of refraction of the substrate by heating the structure to an elevated temperature; cooling the substrate; applying a layer of chromium to cover the light conductors and the undiffused layer of diffusion material; removing the layer of polycrystalline silicon together with those portions of the diffusion material and chromium layer arranged thereupon to expose said one surface of the substrate adjacent to the light conductors; applying a layer of positive-acting photo-lacquer on said one surface and the remaining portion of the layer of chromium; exposing the layer of photo-lacquer through the substrate with the remaining chromium layer disposed on the light conductors acting as a mask; developing the layer of photo-lacquer so that the unexposed portions remain on the chromium layers covering the light conductors and the exposed portions are removed from said one surface of the substrate; applying a metal layer to the exposed portions of said one surface of the substrate with the remaining photo-lacquer acting as a mask; removing the remaining photo-lacquer along with the metal layer deposited thereon; and then etching the chromium layers from the light conductors.

2. A method according to claim 1, wherein the substrate is lithium tantalate crystal.

3. A method according to claim 1, wherein the high temperature is above the Curie temperature of the lithium tantalate and wherein the step of cooling includes applying an electrical field which is parallel to said one surface and at right angles to the longitudinal axis of the light conductors to insure the desired orientation of the $c$-axis of the substrate.

4. A method according to claim 1, wherein the substrate is a lithium niobate crystal.

5. A method according to claim 1, wherein subsequent to the step of developing the photo-lacquer layer and prior to the step of applying a metal layer, laterally etching the chromium layer to produce undercuts therein.

6. A method according to claim 5, wherein the substrate is a lithium tantalate crystal.

7. A method according to claim 5, wherein the substrate is a lithium niobate crystal.

8. A method according to claim 1, which includes prior to the step of applying a metal layer to form the electrodes, applying a thin dielectric layer having an index of refraction lower than the index of refraction of the substrate so that the subsequently applied metal layer to form the electrodes is spaced from said one surface by the dielectric layer.

9. A method according to claim 8, which further includes subsequent to developing the photo-lacquer layer and prior to applying the dielectric layer, laterally etching the chromium layer to produce undercuts therein.

* * * * *